United States Patent Office 2,701,983
Patented Feb. 15, 1955

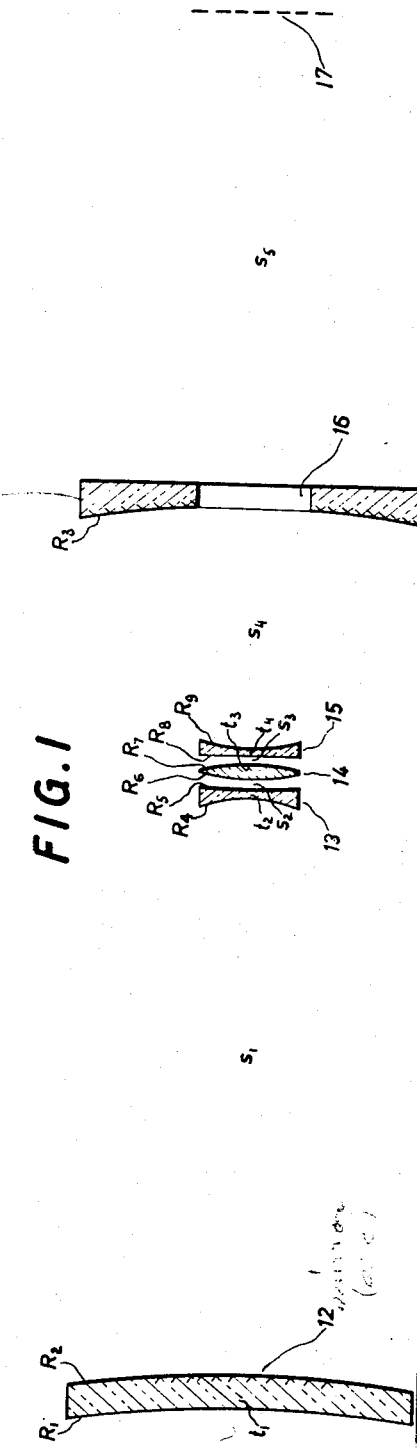

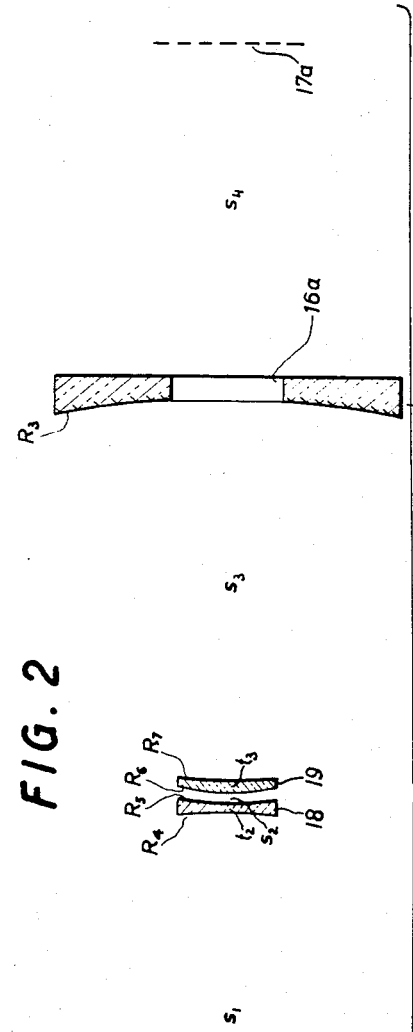
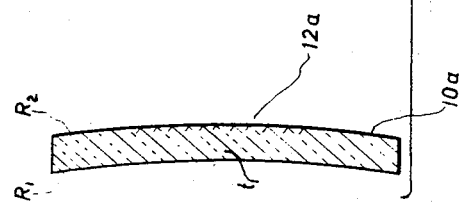

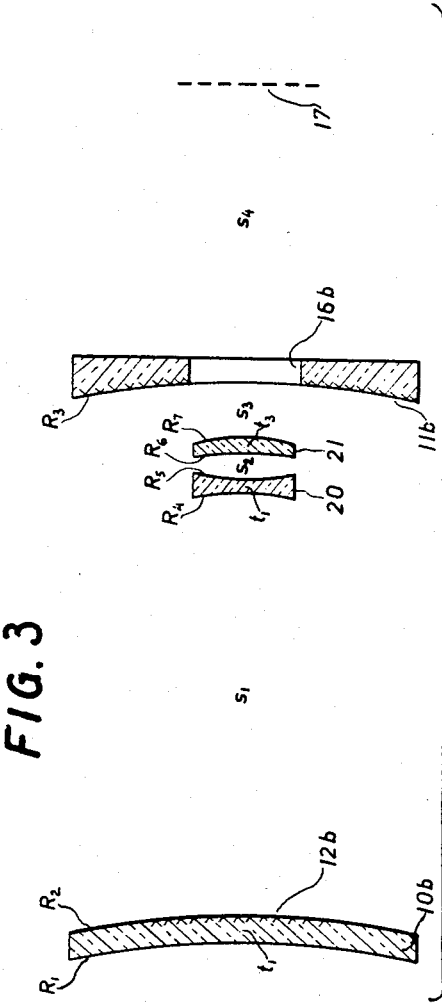

2,701,983
CATADIOPTRIC TELEPHOTO SYSTEMS

Frank G. Back and Herbert Lowen, Glen Cove, N. Y.; said Lowen assignor to said Back Application November 25, 1953, Serial No. 394,398

5 Claims. (Cl. 88—57)

The present invention relates to optical systems and in particular to catadioptric telephoto systems for still cameras, motion picture cameras, television cameras and all such devices in which objectives with very long focal lengths are required.

It is an object of the present invention to provide objectives which possess very long equivalent focal length in combination with relatively short length and light weight construction and which display also a high degree of correction for all aberrations over the entire field.

It is a further object of the present invention to provide a novel construction for teleobjectives in which the positive front element is replaced by an arrangement of spherical mirrors.

Conventional telephoto lenses consist of a positive front element in combination with a negative rear element. To satisfy the requirements of extremely long focal length, conventional lenses of necessity were required to have a substantial length. By means of the present invention a novel construction for teleobjectives is provided in which the physical dimensions of the lens are substantially reduced so that the necessity for long unwieldy equipment is eliminated while the requirements for very long focal length are satisfactorily met. The mirror arrangement of the present invention permits a reduction in size of the equipment due to the employment of a "folded" light path.

To illustrate the present invention reference is had to Fig. 1 and it will be seen that the image forming axial parallel rays pass from the object through the substantially powerless correction plate 10 and are impinged on the spherical concave primary mirror 11 which reflects these rays on to the secondary convex mirror 12 which is formed upon the rear center portion of the convex side of the correction plate 10; the secondary convex mirror 12 therefore has the same radius of curvature as this convex side of the correction plate 10. The secondary convex mirror 12 reflects the rays impinged thereon in such manner that they pass through the negative rear element constituted by lens systems 13, 14 and 15 (a non-cemented triplet) or the lenses 18 and 19 and 20 and 21 which respectively constitute non-cemented doublets employed as negative rear elements in the herein illustrated three embodiments of the present invention. The rays passing through the negative rear element pass from thence through the aperture 16 provided in the center of the primary concave spherical mirror 11 to the focal plane 17.

Preferred forms of the present invention are illustrated in the accompanying drawings, in which:

Fig. 1 is a schematic cross-sectional view of one embodiment of the present invention illustrating a lens of 150" equivalent focal length.

Fig. 2 is a view like Fig. 1 illustrating another embodiment constituting a modification of a construction in accordance with the present invention accomplished by the replacement of the negative rear element and illustrating a lens of 80" equivalent focal length.

Fig. 3 is a view like Fig. 1 illustrating a lens of 40" equivalent focal length.

Fig. 4 is a table of data as they apply to the telephoto system illustrated in Fig. 1.

Fig. 5 is a table of data as they apply to the telephoto system illustrated in Fig. 2; and Fig. 6 is a table of data as they apply to the telephoto system illustrated in Fig. 3.

Having now reference to the drawings it will be seen that Fig. 1 represents a catadioptric telephoto system which has an equivalent focal length of 150". The annular entrance pupil of the system corresponds to a speed of F:25. The values for the components are as follows:

| Lens | Glass | Radii | Thickness | Separation |
|---|---|---|---|---|
| Corrector Plate 10, Secondary Mirror 12 | BSC $N_D=1.517$ $V=64.5$ | $R_1=-65.354''$ $R_2=+66.479''$ | $t_1=.674''$ | $s_1=11.285''$ |
| Negative Rear Element 13 | DBC $N_D=1.611$ $V=58.8$ | $R_4=-2.693''$ $R_5=-25.046''$ | $t_2=.150''$ | $s_2=.160''$ |
| Negative Rear Element 14 | LF $N_D=1.5795$ $V=41.0$ | $R_6=+4.238''$ $R_7=+4.238''$ | $t_3=.250''$ | $s_3=.175''$ |
| Negative Rear Element 15 | DBC $N_D=1.611$ $V=58.8$ | $R_8=$ Inf. $R_9=-3.681''$ | $t_4=.150''$ | $s_4=5.210''$ |
| Primary Mirror 11 To Focal Plane | | $R_3=-56.800''$ | | $s_5=12.790''$ |

Equivalent focal length 150.00".
Equivalent relative aperture F:25.
BSC—boro silicate crown.
DBC—dense barium crown.
LF—light flint.
$N_D$—index of refraction for sodium light 5893 Å.
V—Abbe's dispersion number.

A further modification of the present invention is illustrated in Fig. 2 in which a system with an 80" equivalent focal length having an equivalent relative aperture of F:15 is illustrated.

The construction here below set forth shows an alternate adaption and modification of the present invention as illustrated in Fig. 1 in which a non-cemented doublet is employed as a negative rear element whereas in Fig. 1 an arrangement having as a negative rear element a non-cemented triplet was shown. The values for the 80" equivalent focal length F:15 system are as follows:

| Lens | Glass | Radii | Thickness | Separation |
|---|---|---|---|---|
| Corrector Plate 10a, Secondary Mirror 12a | BSC $N_D=1.517$ $V=64.5$ | $R_1=-65.354''$ $R_2=+66.479''$ | $t_1=.674''$ | |
| | | | | $s_1=8.888''$ |
| Negative Rear Element 18 | BSC $N_D=1.517$ $V=64.5$ | $R_4=-10.603''$ $R_5=-6.079''$ | $t_2=.200''$ | |
| | | | | $s_2=.125''$ |
| Negative Rear Element 19 | DF $N_D=1.621$ $V=36.2$ | $R_6=+5.735''$ $R_7=-17.570''$ | $t_3=.300''$ | |
| | | | | $s_3=7.867''$ |
| Primary Mirror 11a | | $R_8=-56.800''$ | | |
| To Focal Plane | | | | $s_4=6.300''$ |

Equivalent focal length 80.00".
Equivlent relative aperture F:15.
BSC—boro silicate crown.
DF—dense flint.
$N_D$—index of refraction for sodium light 5893 Å.
V—Abbe's dispersion number.

Having now reference to Fig. 3 it will be seen that a further adaptation and modification of the present invention is illustrated wherein a catadioptric telephoto system of 40" equivalent focal length and equivalent relative aperture F:8 having a negative system consisting of a non-cemented doublet is constructed in accordance with the present invention. The values for this system are as follows:

| Lens | Glass | Radii | Thickness | Separation |
|---|---|---|---|---|
| Corrector Plate 10b, Secondary Mirror 12b | BSC $N_D=1.517$ $V=64.5$ | $R_1=-36.979''$ $R_2=+36.979''$ | $t_1=.700''$ | |
| | | | | $s_1=8.182''$ |
| Negative Rear Element 20 | BSC $N_D=1.517$ $V=64.5$ | $R_4=-11.657''$ $R_5=-11.657''$ | $t_2=.200''$ | |
| | | | | $s_2=.400''$ |
| Negative Rear Element | DF $N_D=1.621$ $V=36.2$ | $R_6=-30.433''$ $R_7=+9.598''$ | $t_3=.390''$ | |
| | | | | $s_3=.828''$ |
| Primary Mirror 11b | | $R_8=-35.512''$ | | |
| To Focal Plane | | | | $s_4=5.272''$ |

Equivalent focal length 40.00".
Equivalent relative aperature F:B.
BSC—boro silicate crown.
DF—dense flint.
$N_D$—index of refraction for sodium light 5893 Å.
V—Abbe's dispersion number.

As it will be evident from the foregoing description of three preferred forms of the present invention illustrated in Figs. 1, 2, 3, respectively that the positive front element is substituted by an arrangement of mirrors which has good adaptability for use in combination with a selected variety of negative systems and provides due to the specific charactertistics inherent in mirror arrangements for a high degree of correction relative to aberration over the entire field. This system constituted of a positive front element consisting of an arrangement of mirrors and a negative rear element comprising non-cemented doublets and triplets respectively, possesses the distinct advantage of being adaptable to short length and light weight construction. A further aspect of the present invention resides in the fact, that the secondary spherical convex mirror has the same radius of curvature as a convex surface of the correction plate so that the rear center portion of the correction plate can be prepared for use as the secondary spherical convex mirror without requiring special grinding and polishing operations.

It is obvious that various modifications may be made in the choice of elements and their design and selection by those skilled in the art without thereby departing from the scope of the present invention it being understood that for the purpose of illustration and exemplification three preferred forms of construction embodying the present invention have been set forth.

Having set forth our invention what we desire to claim and secure by Letters Patent is:

1. A catadioptric telephoto system comprising in combination a positive front system consisting of a substantially powerless meniscus shaped correction plate, a primary concave mirror and a secondary convex mirror and a negative rear system consisting of a non-cemented air-separated plural lens element combination, the concave face portion of said powerless meniscus shaped correction plate facing the object, the convex rear centered portion thereof provided with a mirrored surface adapted to form the secondary convex spherical mirror of said positive front system, a spherical concave mirror, spaced a predetermined distance behind said correction plate and secondary convex spherical mirror, said concave mirror adapted to reflect rays passing through the correction plate upon said convex spherical mirror, a negative auxiliary system positioned in the ray passage between the convex spherical secondary mirror and a central aperture provided within said spherical concave mirror said arrangement adapted to permit light rays to pass from the object through the correction plate to the concave spherical primary mirror from thence to the convex spherical secondary mirror, from thence through the negative rear system and through the aperture in said concave primary mirror onto the film plane.

2. In a catadioptric telephoto system, in accordance with claim 1, the spherical concave primary mirror and the spherical convex secondary mirror adapted to form the positive front system thereof and an uncemented negative lens component comprising a triplet adapted to form the negative rear system thereof.

3. In a catadioptric telephoto system in accordance with claim 1 a lens arrangement comprising:

| Lens | Glass | Radii | Thickness | Separation |
|---|---|---|---|---|
| Corrector Plate 10, Secondary Mirror 12 | BSC $N_D$= 1.517 V =64.5 | $R_1$=−65.354″ $R_2$=+66.479″ | $t_1$=.674″ | |
| Negative Rear Element 13 | DBC $N_D$= 1.611 V =58.8 | $R_4$=− 2.693″ $R_5$=−25.046″ | $t_2$=.150″ | $s_1$=11.285″ |
| Negative Rear Element 14 | LF $N_D$= 1.5795 V =41.0 | $R_6$=+ 4.238″ $R_7$=+ 4.238″ | $t_3$=.250″ | $s_2$= .160″ |
| Negative Rear Element 15 | DBC $N_D$= 1.611 V =58.8 | $R_8$=Inf. $R_9$=− 3.681″ | $t_4$=.150″ | $s_3$= .175″ |
| Primary Mirror 11 To Focal Plane | | $R_3$=−56.800″ | | $s_4$= 5.210″ $s_5$=12.790″ | wherein the equivalent focal length is 150.00″; the equivalent relative aperture is F:25 and BSC is boro silicate crown and DBC is dense barium crown, LF is light flint; and $N_D$ is the index of refraction for sodium light 5893 Å., and V is Abbe's dispersion number: $t$ indicates thickness, $s$ indicates separation and R is the radius of the curvature.

4. In a catadioptric telephoto system in accordance with claim 1 a lens arrangement comprising:

| Lens | Glass | Radii | Thickness | Separation |
|---|---|---|---|---|
| Corrector Plate 10a, Secondary Mirror 12a | BSC $N_D$= 1.517 V=64.5 | $R_1$=−65.354″ $R_2$=+66.479″ | $t_1$=.674″ | |
| Negative Rear Element 18 | BSC $N_D$= 1.517 V=64.5 | $R_4$=−10.603″ $R_5$=− 6.079″ | $t_2$=.200″ | $s_1$=8.888″ |
| Negative Rear Element 19 | DF $N_D$= 1.621 V=36.2 | $R_6$=+ 5.735″ $R_7$=−17.570″ | $t_3$=.300″ | $s_2$= .125″ |
| Primary Mirror 11a To Focal Plane | | $R_3$=−56.800″ | | $s_3$=7.867″ $s_4$=6.300″ | wherein the equivalent focal length is 80.00″; the equivalent relative aperture is F:15 and BSC is boro silicate crown and DF is dense flint; and $N_D$ is index of refraction for sodium light 5893 Å., and V is Abbe's dispersion number; $t$ indicates thickness, $s$ indicates separation and R is the radius of the curvature.

5. In a catadioptric telephoto system in accordance with claim 1 a lens arrangement comprising:

| Lens | Glass | Radii | Thickness | Separation |
|---|---|---|---|---|
| Corrector Plate 10b, Secondary Mirror 12b | BSC $N_D$= 1.517 V=64.5 | $R_1$=−36.979″ $R_2$=+36.979″ | $t_1$=.700″ | |
| Negative Rear Element 20 | BSC $N_D$= 1.517 V=64.5 | $R_4$=−11.657″ $R_5$=−11.657″ | $t_2$=.200″ | $s_1$=8.182″ |
| Negative Rear Element | DF $N_D$= 1.621 V=36.2 | $R_6$=−30.433″ $R_7$=+ 9.598″ | $t_3$=.390″ | $s_2$= .400″ |
| Primary Mirror 11b To Focal Plane | | $R_3$=−35.512″ | | $s_3$= .828″ $s_4$=5.272″ | wherein the equivalent focal length is 40.00″; the equivalent relative aperture is F:8, and BSC is boro silicate crown and DF is dense flint; and $N_D$ is index of refraction for sodium light 5893 Å., and V is Abbe's dispersion number: $t$ indicates thickness, $s$ indicates separation and R is the radius of the curvature.

References Cited in the file of this patent

UNITED STATES PATENTS

| | | |
|---|---|---|
| 2,378,301 | Kaprelian | June 12, 1945 |
| 2,413,286 | Buchele | Dec. 31, 1946 |
| 2,441,093 | Aklin | May 4, 1948 |
| 2,504,383 | Bouwers et al. | Apr. 18, 1950 |
| 2,576,436 | Baker | Nov. 27, 1951 |
| 2,608,129 | Taylor | Aug. 26, 1952 |
| 2,610,547 | Bach | Sept. 16, 1952 |

FOREIGN PATENTS

| | | |
|---|---|---|
| 824,558 | Germany | Dec. 13, 1951 |